May 31, 1955

J. W. LAFFERTY ET AL 2,709,330

ASPARAGUS HARVESTER

Filed Nov. 10, 1952

INVENTORS.
Howard Lloyd Miller
John W. Lafferty
BY
Greek Wells Atty.

May 31, 1955 J. W. LAFFERTY ET AL 2,709,330
ASPARAGUS HARVESTER
Filed Nov. 10, 1952 5 Sheets-Sheet 2
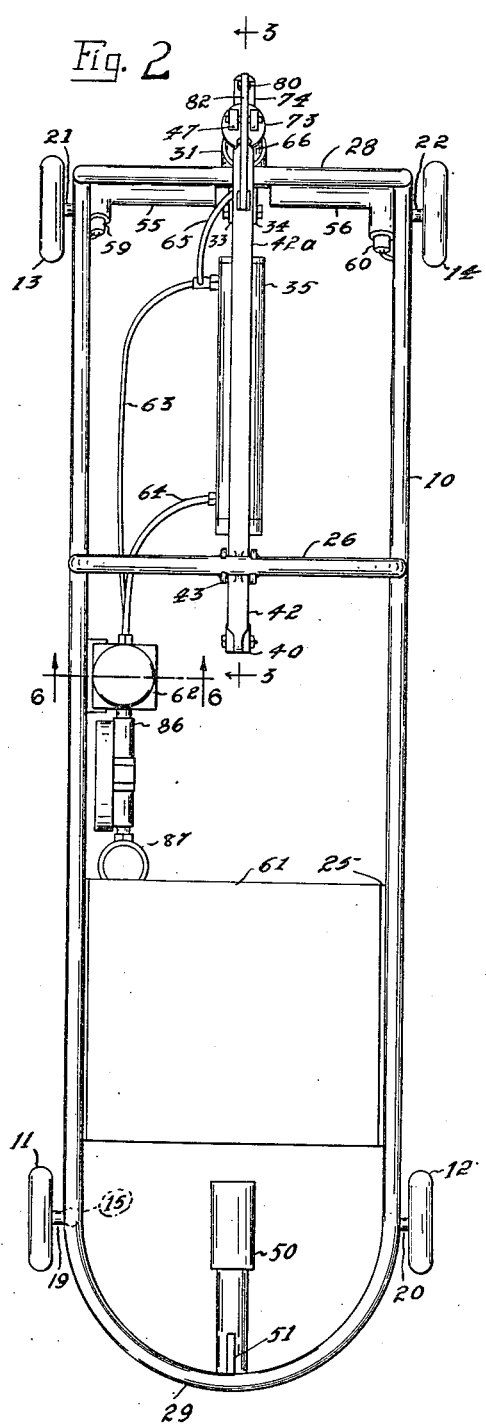
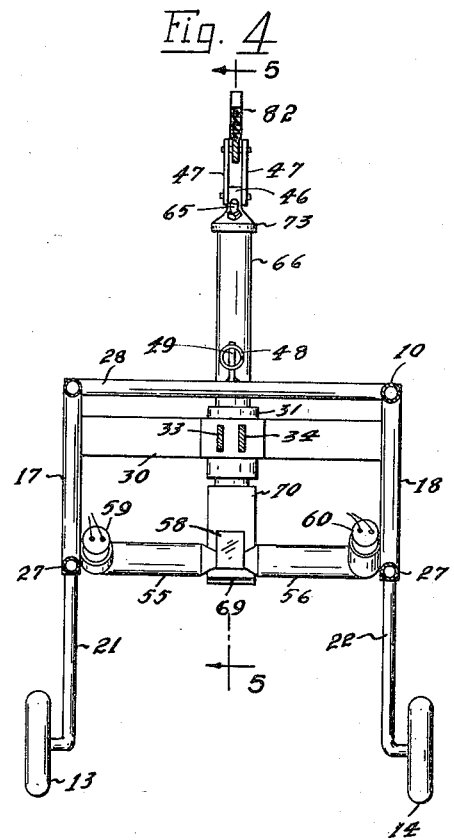
INVENTORS
Howard Lloyd Miller
John W. Lafferty
BY
*Fruk Wells*
Atty.

May 31, 1955
J. W. LAFFERTY ET AL
2,709,330
ASPARAGUS HARVESTER
Filed Nov. 10, 1952
5 Sheets-Sheet 3
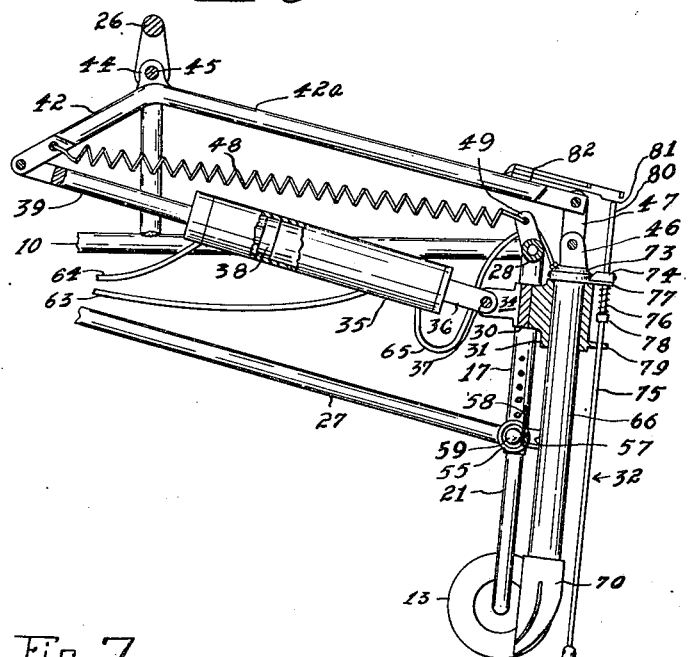
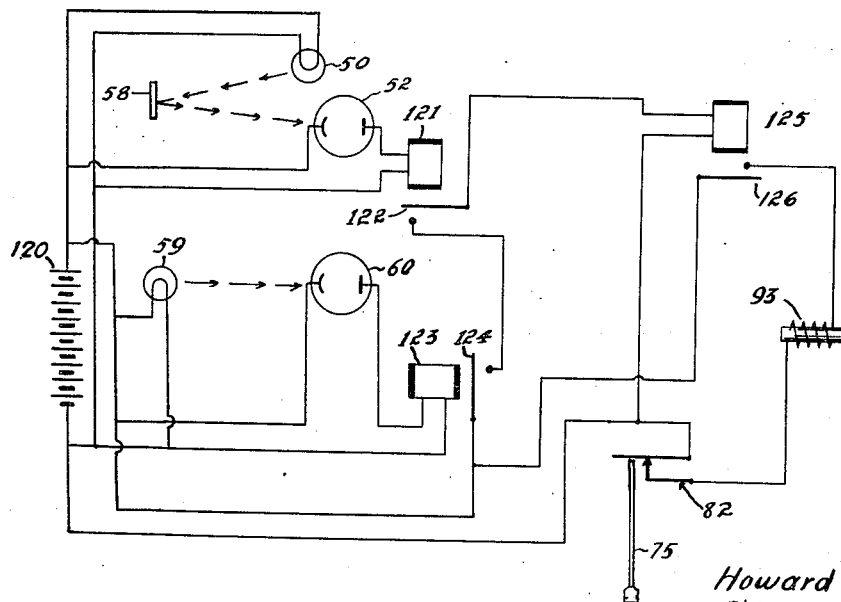
INVENTORS
Howard Lloyd Miller
John W. Lafferty
By Greek Wells
Atty.

May 31, 1955    J. W. LAFFERTY ET AL    2,709,330
ASPARAGUS HARVESTER
Filed Nov. 10, 1952    5 Sheets-Sheet 4
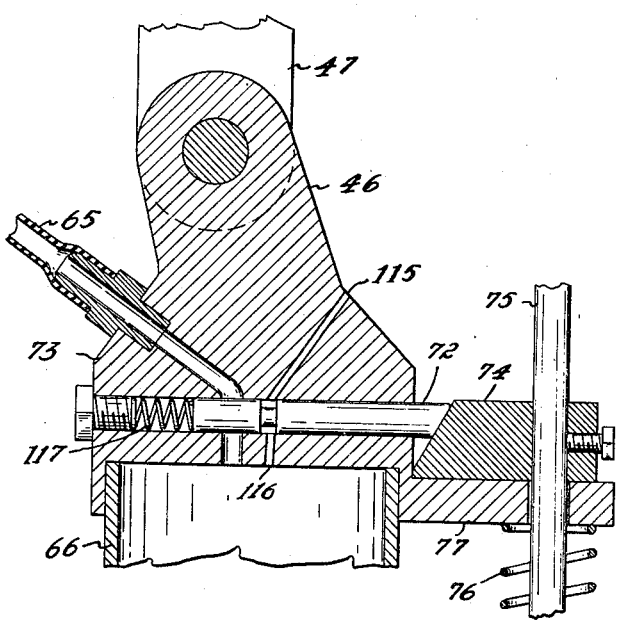
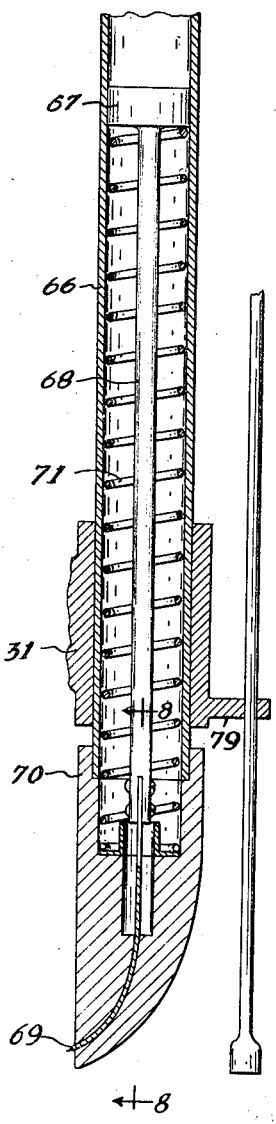
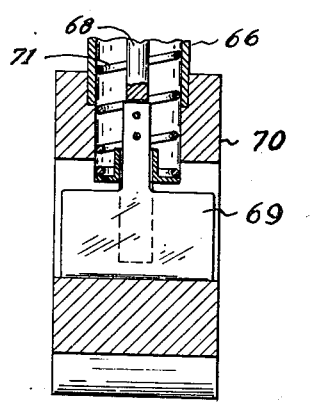
INVENTORS
Howard Lloyd Miller
John W. Lafferty
BY Greek Wells
   atty.

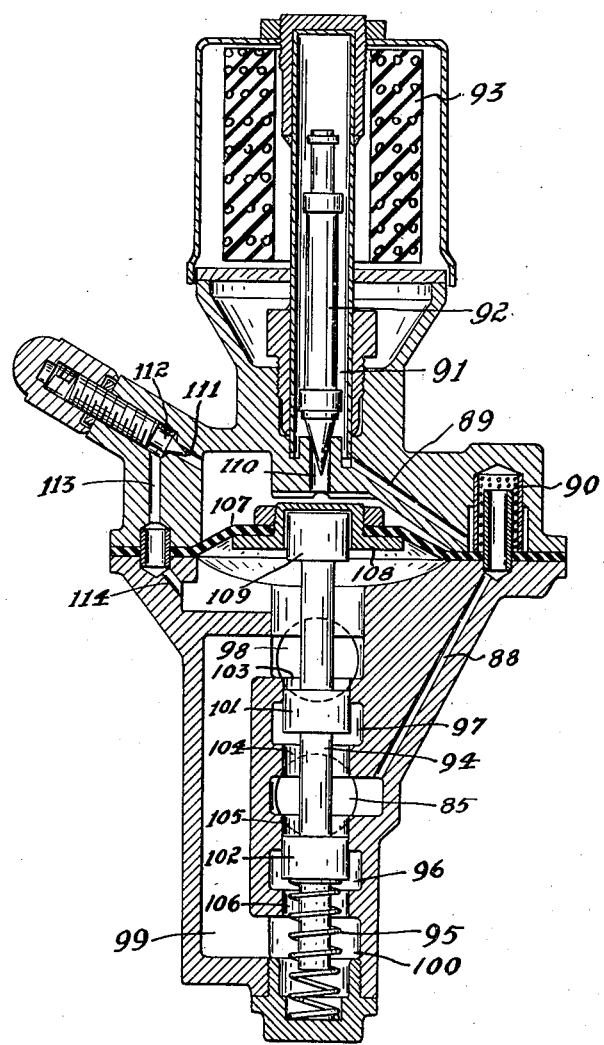

United States Patent Office 2,709,330
Patented May 31, 1955

2,709,330

ASPARAGUS HARVESTER

John W. Lafferty and Howard Lloyd Miller,
Sunnyside, Wash.

Application November 10, 1952, Serial No. 319,676

12 Claims. (Cl. 56—327)

The present invention relates to improvements in an asparagus harvester.

It is well known that hand harvesting of crops like asparagus is a very difficult matter due to the fact that the stalks grow close to the ground and must be cut at or just below the ground level. The asparagus crops do not grow evenly so in providing a device for cutting the crops, one of the problems is that of selecting the particular stalks to be cut. It is the purpose of the present invention to provide a harvester for asparagus which has a normally raised cutting knife carrier carried by a wheeled support, the support having a detecting device adapted to indicate when the knife carrier is approaching a stalk that is tall enough to be cut, a second detecting device operable when the approached stalk is positioned close enough to the knife carrier to be cut for initiating lowering of the carrier means operable to cause the knife when the carrier is lowered, to cut the stalk and a returning mechanism for again raising the carrier.

More specifically, it is the purpose of the present invention to provide a novel detecting apparatus utilizing two light beams which are directed in such a way that one of the light beams indicates the approach of the stalk by being cut off from reaching a photoelectric cell and the other light beam indicates when the knife has advanced far enough to cut the stalk, the actual operation of the knife being controlled by the breaking of both light beams at the same time. The invention as hereinafter shown and described, illustrates the operation with a single knife and a single approaching beam. By duplicating the knife and the approaching beam arrangement, it is possible to cover a wide distribution of stalks.

It is also an object of the present invention to provide a novel cutting mechanism for cutting off asparagus stalks at the ground level, including a normally retracted knife, a carrier therefor which is normally raised so as not to drag on the ground and which is lowered when a stalk is to be cut, together with a trip mechanism operable when the knife carrier engages the ground to project the knife and cause it to cut a stalk in front of the knife support and to initiate return of the carrier to raised position.

The nature and advantages of the invention will appear more fully from the following description and the accompanying drawings wherein a preferred form of the invention is shown. It should be understood however, that the drawings and description are illustrative only and are not intended to limit the invention except insofar as it is limited by the claims.

In the drawings:

Figure 2 is a top plan view of the machine;

Figure 3 is a fragmentary sectional view taken substantially on the line 3—3 of Figure 2;

Figure 4 is a sectional view taken substantially on the line 4—4 of Figure 1;

Figure 5 is an enlarged vertical sectional view taken through the knife supporting and operating mechanism taken on the line 5—5 of Figure 4;

Figure 6 is a fragmentary sectional view illustrating the details of the main control valve taken on the line 6—6 of Figure 2;

Figure 7 is a wiring diagram illustrating the electrical connections to the various control elements of the machine.

Figure 8 is an enlarged fragmentary sectional view on the line 8—8 of Figure 5; and Figure 9 is an enlarged fragmentary view, with parts broken away and shown in section, of the knife operating mechanism at the top of Figure 4.

Figure 1:
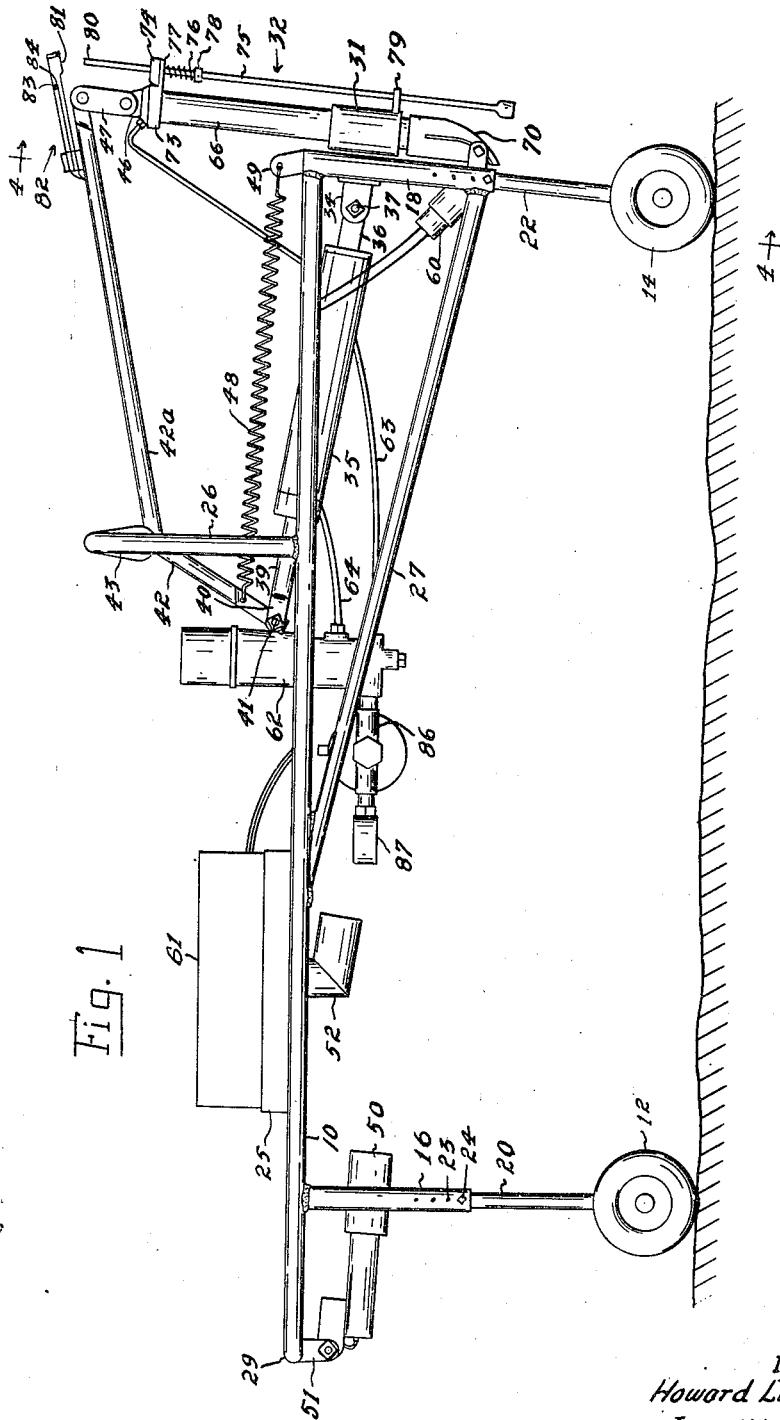
Figure 1 is a view in side elevation of a harvesting machine embodying the invention.

The harvester of the present invention utilizes a supporting frame 10 which is substantially rectangular in outline. Four wheels, 11, 12, 13 and 14 support the frame 10 at the proper level above the ground. The frame has depending tubular members such as 15, 16, 17 and 18. The wheels have posts 19, 20, 21 and 22 that telescope with the tubular members 15, 16, 17 and 18. Apertures 23 in the tubular members and the posts, and bolts 24 provide for vertical adjustment of the support 10 with respect to the ground level. An instrument panel 25 is provided adjacent to the wheels 11 and 12. A raised yoke 26 connects the sides of the frame 10 intermediate the end thereof and braces 27 connect the upright tubular members 17 and 18 to the frame 10 to provide the necessary rigidity. The frame 10 includes a rear cross bar 28 and a front bowed cross bar 29.

The tubular members 17 and 18 are also connected together below the cross bar 28 by a plate 30. The plate 30 serves as a mounting for a bearing sleeve 31 which slidably mounts a cutting device 32, the details of which will be explained more fully hereinafter. The plate 30 also carries ears 33 and 34 for mounting one end of an operating cylinder 35 that is adapted to raise and lower the cutting device 32. The cylinder 35 has a bar 36 that fits between the ears 33 and 34. A bolt 37 pivots the bar 36 to the ears 33 and 34. The cylinder 35 has a piston 38 therein, the rod 39 of which has a bifurcated end 40 which is pivoted by a bolt 41 to a lever arm 42. The yoke 26 has ears 43 thereon and the lever arm 42 has an ear 44 that fits between the ears 43 and is pivoted thereto by a bolt 45. The lever arm 42 is bent at the ear 44 and has a portion 42a that extends rearwardly beyond the cross bar 28. The rear end of the portion 42a is connected to the upper end of the cutting device 32. An ear 46 is provided on the upper end of the cutting device. Links 47 connect the ear 46 to the rear end of the portion 42a. It is evident that the cylinder 35, the piston 38 and the piston rod 39, together with the lever 42—42a and the links 47 provide a mechanism by which the cutting device 32 can be lowered from the raised position shown in Figure 1 to the lowered position shown in Figure 3. A spring 48 under tension between the lever arm 42 and an ear 49 on the cross bar 28 is made sufficiently strong to normally hold the cutting device 32 in raised position.

The detecting means for detecting a stalk tall enough to be cut as it approaches the cutting device 32, comprises a lamp unit 50 which is suspended from a bracket 51 on the front frame portion 29 and which faces rearwardly toward the cutting device. The control panel 25 has a photoelectric cell unit 52 depending therefrom and also facing toward the cutting device 32. The rear upright tubular members 17 and 18 have two tubular members 55 and 56. These tubular members 55 and 56 mounted thereon are connected by a bar 57. A mirror 58 is mounted in front of the bar 57 and supported by the bar. The mirror 58 is so positioned that light from the lamp unit 50 striking the mirror, will be reflected to the photoelectric cell unit 52.

The tubular members 55 and 56 are housings for a lamp unit 59 and a photoelectric cell unit 60. The lamp unit 59 directs a beam of light through the tubular members 55 and 56 in front of the mirror 58 to the photoelectric cell unit 60.

It is believed to be evident from the foregoing description and the drawings that if an asparagus stalk to be cut breaks the light beam from the lamp unit 50 to the mirror 58, and the machine is drawn forward until this stalk also breaks the light beam from the lamp unit 59 to the photoelectric cell 60, both photoelectric cell units 52 and 60 will have their light sources cut off at the same time. The control mechanism for operating the cutting device 32 is of such a nature that only when the two units 52 and 60 have their light sources cut off, will the cutting device 32 be made to operate. The two devices just described comprise a first detecting device indicating when a stalk is aligned with and approaching the cutting device 32 and a second detecting device indicating when the approaching stalk is in proximity to the cutting device.

The photoelectric cell control alone is insufficient to effect proper cutting of the stalk which breaks the light source to both the cell units 52 and 60. It is necessary to gauge the height of the ground because a stalk should be cut at the ground level or slightly below it. An electric control unit 61 is mounted on the control panel 25. An electrically operated valve 62 is mounted on the support 10 and is connected to a suitable source of air under pressure so that it may supply air through air hoses 63 and 64 to opposite sides of the piston 38 in the cylinder 35. The hose 63 also connects to a third hose 65 which supplies air to a cylinder 66 that is part of the cutting device 32. The cylinder 66 has a piston 67 therein which is forced downwardly by air from the hose 65. The piston 67 is connected by a piston rod 68 to a knife 69 which is a flexible blade. A head 70 on the lower end of the cylinder 66 is slotted to provide guide means for the knife 69. The piston 67 in the cylinder 66 is urged upwardly by a spring 71 so that the knife 69 is retracted whenever the air pressure is released from the cylinder 66 above the piston 67.

The knife 69 should not be driven out to cut the asparagus stalk until the cutting device 32 has been lowered into proximity to the ground. Entrance of air to the cylinder 66 from the hose 65 is controlled by a valve 72 that is mounted in a head 73 on the cylinder 66. This valve in turn is opened by a cam member 74 that is fixed to a ground rod 75. The ground rod 75 is normally pressed downward by a spring 76 that is under compression between an ear 77 on the head 73 and a collar 78 on the ground rod 75. The bearing member 31 also carries a guide 79 for the ground rod 75.

The upper end of the ground rod 75 has a portion 80 that is adapted, when the ground rod is pushed up by engagement with the ground, to engage a spring 81 of a switch 82 so as to cause contact members 83 and 84 to be separated. The parts 42a, 47, 46, the cylinder 66 and the parts carried by it constitute a knife carrier that is normally held in raised position. This carrier and the knife 69 constitute the cutting device 32. When the ground rod 75 engages the ground, the opening of the valve 72 takes air into the cylinder 66 from the conduits 63 and 65 so as to lower the air pressure in the cylinder 35 and thus stop the further descent of the carrier. By the time the knife has performed its function the air supply to the conduit 63 is cut off.

Referring now particularly to Figures 1, 4, 6 and 7, the control means by which the cutting device 32 is lowered and the knife 69 is projected at the proper time, will be explained. The valve 62 controls the air supply to the hoses 63 and 64. In this valve the inlet 85 is connected to a source of air under pressure by a conduit 86 (Figure 1). A pressure gauge 87 is provided. Air under pressure is supplied from the inlet 85 through passages 88 and 89 and a strainer 90 to a chamber 91 around a needle valve and solenoid core member 92. The core member 92 is lifted when the winding 93 is energized.

A balanced valve 94 is normally held in the position shown in Figure 6 by a spring 95. The conduit 63 is connected to a chamber 96 in the valve body. The conduit 64 is connected to a chamber 97 in the valve body. The valve body has an exhaust port at 98 and this port is connected by a passage 99 with a chamber 100 at the lower end of the valve body. The valve 94 has an enlarged portion 101 thereon for alternately closing a passage 103, between the chamber 97 and the exhaust port 98, and, a passage 104 between the chamber 97 and the inlet 85. Another enlarged portion 102 on the valve 94 is for alternately closing a passage 105, between the chamber 96 and the inlet 85, and, a passage 106 between the chamber 96 and the chamber 100.

A diaphragm 107 is mounted in the valve body and has a control cap 108 resting on a head 109 provided on the valve 94. Normally the spring 95 holds the diaphragm 107 raised as shown in Figure 6. When the core-needle valve member 92 is lifted by energizing the winding 93, the air flows from the chamber 91 through a valve passage 110 into the space over the diaphragm 107. The diaphragm 107 is depressed by the air pressure to lower the valve 94. This action connects the chamber 97, which is normally open through the passage 104, to the inlet 85, to the exhaust port 98. The air pressure in the conduit 64 is released so that the piston 38 is free to move with the rod 39 from the position shown in Figure 1, to the position shown in Figure 3. The spring 48 opposes this movement but the weight of the cutting device 32 aids it.

The downward movement of the valve 94 also causes the portion 102 to close the passage 106 and open the passage 105. The chamber 96 is thus cut off from the exhaust chamber 100 and passage 99. Air flows into the chamber 96 from the inlet 85 and from the chamber 96 through the conduit 63 to the back side of the piston 38 in the cylinder 35 and to the conduit 65. The air force on the piston 38 overbalances the force of the spring 48 and lowers the cutting device 32. The valve 72 blocks entry of air into the cylinder 66 from the conduit 65 until the ground rod 75 engages the ground and moves the cam 74 up to open the valve 72.

As soon as the valve 72 opens, the air entering the cylinder 66 lowers the piston 67 against the spring 71. This drives the knife 69 out from the head 70 to cut the stalk of asparagus.

The ground rod 75 also separated the contact members 83 and 84 of the switch 82 when it engaged the ground. This separation opened the energizing circuit of the operating winding 93 for the valve 62. The air cannot be cut off from the conduit 65 until the knife 69 has been operated. It is necessary to delay the return of the valve 94 to the starting position long enough to actuate the knife. This delay is accomplished in the construction shown by providing a leak passage from the space above the diaphragm 107 to the space below it which is open to the exhaust port 98.

The leak passage comprises a passage 111, a manually adjustable needle valve 112 and passages 113—114. This leak passage will allow the pressure above the diaphragm 107 to drop slowly until the spring 95 can raise the valve 94. The passage 110 is, of course, closed as soon as the winding 93 is de-energized and the member 92 drops.

As soon as the valve 94 moves up due to equalization of pressure on both sides of the diaphragm 107, the conduits 63 and 65 are opened to atmosphere through the chamber 96, the passage 106, the chamber 100, the passage 99 and the exhaust port 98. The spring 71 raises the piston 67 forcing the air out of the cylinder. As soon as the cutting device 32 rises, the ground rod 75 is forced downward by the spring 76 to lower the cam 74 and to allow the valve 72 to return to position to close off the conduit 65 from the cylinder 66. The head 73 has passages 115 and 116 cooperating with the valve 72 to release air pressure above the piston 67 in the cylinder 66. A spring 117 urges the valve 72 against the cam 74.

The electrical connections are illustrated diagrammatically in Figure 7. A common source of current 120 is carried on the panel 25 to energize the lamps 50 and 59 and to furnish the current to energize the winding. The photoelectric cell 52 is connected with a relay 121 in series so that as long as the cell is made conductive by light from the lamp 50 reflected by the mirror 58, the relay 121 will be energized and will hold open a contact 122 in a circuit that controls energization of the winding 93. In a like manner, the photoelectric cell 60 will, so long as it receives light from the lamp 59, pass current to a relay 123 that holds open another contact 124 in the control circuit. The control circuit includes a relay 125 that will, when energized, close a contact 126 in the current supply lead to the winding 93 of the valve 62.

When a stalk to be cut intercepts the light beam from the lamp 50 to the mirror 58, or the reflected beam from the mirror 58 to the cell 52, the current supply to the relay 121 is cut off and the contact 122 closes. Then, as soon as the stalk breaks the light beam from the lamp 59 to the cell 60, the current supply to the relay 123 is cut off and the contact 124 closes. When both contacts 122 and 124 are closed, current flows to the relay 125 and it closes the contact 126. The switch 82 is closed normally so the winding 93 is energized immediately to actuate the valve 62. The valve 62 supplies air to the conduit 63 and opens the conduit 64 to the atmosphere. The piston 38 and rod 39 are moved to the left (as shown in Figures 1 and 3) to lower the cutting device 32. As soon as the ground rod 75 strikes the ground, it opens the switch 82, thus de-energizing the winding 93. The ground rod also opens the valve 72 to let air into the cylinder 66 and project the knife 69. The delayed action of the valve 62 has already been described. The cutting device 32 returns to the position shown in Figure 1. The cut stalk falls out of the way so that the lamps 50 and 59 again direct their beams to the photoelectric cells 52 and 60. When another stalk has reached a point where it intercepts the beams from the two lamps, the action is repeated to cut the new stalk.

The lifting of the cutting device 32 may be interrupted, before it returns to full height, by a new stalk of asparagus reaching position to break both light passages to the photoelectric cells 52 and 60. The lifting of the device 32 must progress far enough to permit the switch 82 to close. Otherwise the winding 93 cannot be energized to actuate the valve 62. The distance which the device 32 must rise to permit the switch 82 to close is only that distance necessary to allow the ground rod 75 to return to its lower position. If the light passages to the cells 52 and 60 are broken any time after the switch 82 closes, the valve 62 will again be actuated to cause the device 32 to be forced down and the knife 69 to be actuated. This action is fast enough to cut heavy crops where the stalks are close to each other, yet the cutting device is free to rise over a too short stalk that may be encountered.

We have shown only one cutting device. It is evident that a plurality of such devices can be arranged side by side with individual valves and lowering mechanisms. Additional lamps 50, mirrors 58 and photoelectric cells 52 must be provided for each cutting device. However, one lamp 59 and one photoelectric cell 60 can be used for several cutting devices arranged side by side.

It is believed that the nature and advantages of our invention will be apparent from the foregoing description.

Having thus described our invention, we claim:

1. A harvester for asparagus comprising a vehicle, a knife carrier mounted for up and down movement on the vehicle, between a raised position, such that the uncut crop can pass under it, and a lowered position close to the ground, a knife on the carrier operable upon lowering of said carrier to project forwardly for severing a stalk in front of the carrier, and control mechanism for said carrier comprising a control means on the vehicle in front of the carrier operated by approach of said carrier directly toward a stalk to be cut, a second control means on the vehicle in front of the carrier operated only when the carrier is close enough to a stalk in front of it for the forward thrust of the knife to sever the stalk, and power means, connected to said control mechanism and said carirer to be operable, only when both said control means are operated, to lower said carrier.

2. A harvester for asparagus comprising a vehicle having a supporting frame, a cutting device mounted for up and down movement on said frame, power means mounted on said frame to lower said device, means mounted on said frame normally holding said device raised to pass over stalks, a detecting device on said frame adapted to indicate when the cutting device is aligned with and approaching a stalk to be cut, a second detecting device on said frame adapted to indicate when the approached stalk is in proximity to the cutting device, said power means being responsive only to the indications from both detecting devices to lower the cutting device to cutting position and a trip member on the cutting device positioned to strike the ground when the cutting device is lowered into cutting position and prevent further lowering of the cutting device.

3. A harvester for asparagus comprising a vehicle, a cutting device thereon, mounted for up and down movement between a raised position to pass over growing stalks and a lowered position in proximity to the ground, means on the vehicle to lift said device and hold it in raised position, means on the vehicle to lower the device to lowered position, a first detecting device on the vehicle operated only when the cutting device is aligned with and approaching a stalk to be cut, a second detecting device on the vehicle operated when the approached stalk is in proximity to the cutting device, the lowering means for said cutting device operating in response to the joint operation of said detecting devices to lower the cutting device, ground engaging means movably carried by the cutting device and projecting below the cutting device for movement thereon by engaging the ground, the ground engaging means having a member thereon operably connected to the lowering means to deenergize said lowering means upon said movement of the ground engaging means, said ground engaging means having a member thereon operably connected to the lifting means to energize the lifting means upon said movement of the ground engaging means.

4. A harvester for asparagus comprising a vehicle, a cutting device thereon, mounted for up and down movement between a raised position to pass over growing stalks and a lowered position in proximity to the ground, means on the vehicle to lift said device and hold it in raised position, means on the vehicle to lower the device to lowered position, a first detecting device on the vehicle operated only when the cutting device is aligned with and approaching a stalk to be cut, a second detecting device on the vehicle operated when the approached stalk is in proximity to the cutting device, the lowering means for said cutting device operating in response to the joint operation of said detecting devices to lower the cutting device.

5. A harvester for asparagus comprising a vehicle, a knife carrier mounted for up and down movement on the vehicle, between a raised position, such that the uncut crop can pass under it, and a lowered position close to the ground, a knife on the carrier operable upon lowering of said carrier to project forwardly for severing a stalk in front of the carrier, and control mechanism on the vehicle for said carrier comprising detecting means mounted on the vehicle in front of said carrier in position to be operable only by approach of said carrier directly to a stalk in front of it close enough for forward projection of the knife to sever the stalk, carrier lowering means on the vehicle operably connected to said detecting means to lower said carrier when the detecting means is operated by a stalk, a ground engaging member movably mounted on the carrier for upward movement and projecting below the carrier, said member being operably connected to said lowering means to stop the downward movement of the carrier, and knife projecting means in said carrier, operable, upon upward movement of said member on the carrier, to project the knife forward.

6. In an asparagus harvester, a vehicle, a cutting device mounted on the vehicle for movement up and down between a raised position to pass over the stalks and a lowered position for cutting, with two stalk detecting devices on the vehicle in front of said cutting device for detecting the longitudinal alignment of an approached stalk to the device and the proximity of the stalk to the device, and power means on the vehicle jointly controlled by said detecting devices for lowering the cutting device.

7. In an asparagus harvester, a vehicle, a cutting device mounted on the vehicle for movement up and down between a raised position to pass over the stalks and a lowered position for cutting, with two stalk detecting devices on the vehicle in front of said cutting device for detecting the longitudinal alignment of an approached stalk to the device and the proximity of the stalk to the device, power means on the vehicle jointly controlled by said detecting devices for lowering the cutting device, a ground engaging member on the cutting device adapted to be moved relatively to the cutting device by engagement with the ground upon movement of the cutting device into its lowered position and means actuated by movement of said member upon its engagement with the ground, to cause the power means to lift the cutting device.

8. In an asparagus harvester, a vehicle, a cutting device mounted on the vehicle for movement up and down between a raised position to pass over the stalks and a lowered position for cutting, said cutting device comprising a carrier and a knife movably mounted therein for projection forwardly and downwardly to cut a stalk positioned in front of the carrier, power means mounted on the vehicle and operably connected to the carrier and the knife for raising and lowering the carrier and projecting the knife, and a ground engaging control member movable on said carrier adapted to be moved relatively to the cutting device by engagement with the ground upon movement of the cutting device into its lowered position and operable when the carrier is lowered by the power means to ground level to cause the power means to project the knife.

9. In an asparagus harvester, a vehicle, a cutting device mounted on the vehicle for movement up and down between a raised position to pass over the stalks and a lowered position for cutting, said cutting device comprising a carrier and a knife movably mounted therein for projection forwardly and downwardly to cut a stalk positioned in front of the carrier, power means mounted on the vehicle and operably connected to the carrier and the knife for raising and lowering the carrier and projecting the knife, and a ground engaging control member movable on said carrier adapted to be moved relatively to the cutting device by engagement with the ground upon movement of the cutting device into its lowered position and operable when the carrier is lowered by the power means to ground level to cause the power means to project the knife, said ground engaging member including means to reverse said power means when the member has engaged the ground, to thereafter lift the carrier.

10. In an asparagus harvester, a vehicle, a cutting device carried thereby, said cutting device comprising a cylinder, a piston therein, a knife guide on the lower end of said cylinder, a knife blade slidable in said guide to project therefrom for cutting an asparagus stalk, a rod connecting the knife to the piston, spring means in the cylinder pressing upwardly on the piston for raising the piston to retract the knife, a fluid supply means on the vehicle including a conduit connected to said cylinder at the top thereof for supplying fluid under pressure to the cylinder above the piston for projecting the knife, means on the vehicle connected to the cutting device to raise and lower the cutting device, a ground engaging rod movably mounted on the cutting device and projecting downwardly to engage the ground as the lower end of the cutting device approaches the ground, and valve means in said conduit actuated by said rod and controlling the fluid flow into and out of said cylinder.

11. In an asparagus harvester, a vehicle, a cutting device carried thereby, said cutting device comprising a cylinder, a piston therein, a knife guide on the lower end of said cylinder, a knife blade slidable in said guide to project therefrom for cutting an asparagus stalk, a rod connecting the knife to the piston, spring means in the cylinder pressing upwardly on the piston for raising the piston to retract the knife, a fluid supply means on the vehicle including a conduit connected to said cylinder at the top thereof for supplying fluid under pressure to the cylinder above the piston for projecting the knife, means on the vehicle connected to the cutting device to lower the cylinder, to the ground, and control means mounted on the vehicle in front of said cylinder interconnected with said lowering means to be operable upon approach of the cylinder into proximity to a stalk to be cut for actuating the lowering means.

12. In an asparagus harvester, a vehicle, a cutting device carried thereby, said cutting device comprising a cylinder, a piston therein, a knife guide on the lower end of said cylinder, a knife blade slidable in said guide to project therefrom for cutting an asparagus stalk, a rod connecting the knife to the piston, spring means in the cylinder pressing upwardly on the piston for raising the piston to retract the knife, a fluid supply means on the vehicle including a conduit connected to said cylinder at the top thereof for supplying fluid under pressure to the cylinder above the piston for projecting the knife, means on the vehicle connected to the cutting device to lower the cylinder, to the ground, ground engaging means on the cylinder operable upon engaging the ground to reverse the lowering means, and control means mounted on the vehicle in front of said cylinder interconnected with said lowering means to be operable upon approach of the cylinder into proximity to a stalk to be cut for actuating the lowering means.

References Cited in the file of this patent

UNITED STATES PATENTS

| | | |
|---|---|---|
| 1,775,142 | Sanborn | Sept. 9, 1930 |
| 2,177,803 | Ferte et al. | Oct. 31, 1939 |
| 2,581,119 | Matteoli | Jan. 1, 1952 |